Dec. 27, 1932.   J. L. BERNEY   1,892,132
ATOMIZING ATTACHMENT FOR AIRPLANE ENGINE EXHAUSTS
Filed Sept. 29, 193‾
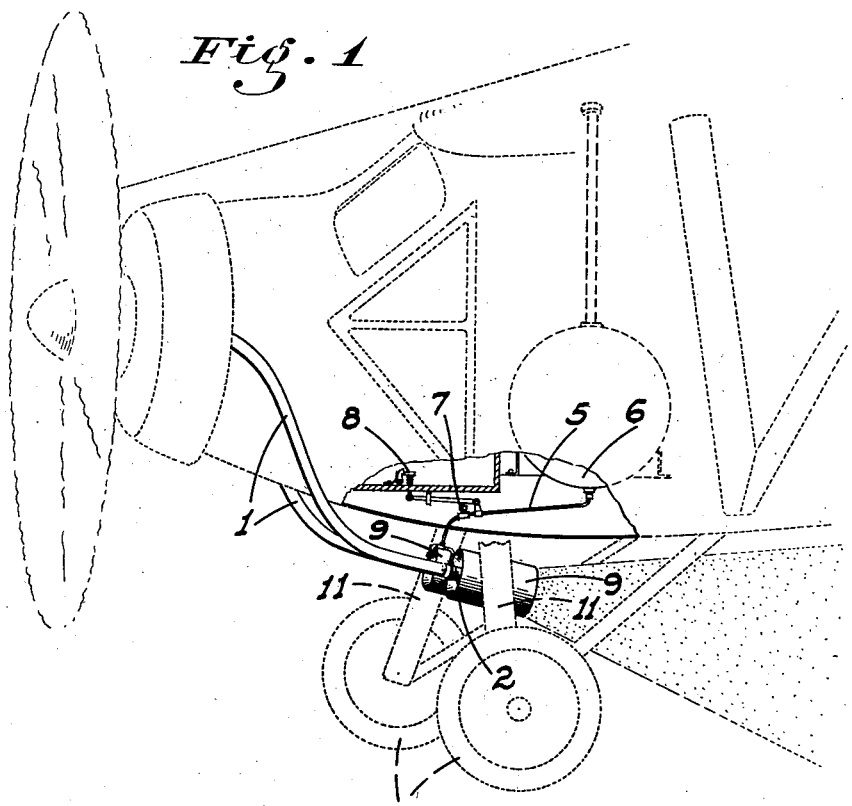
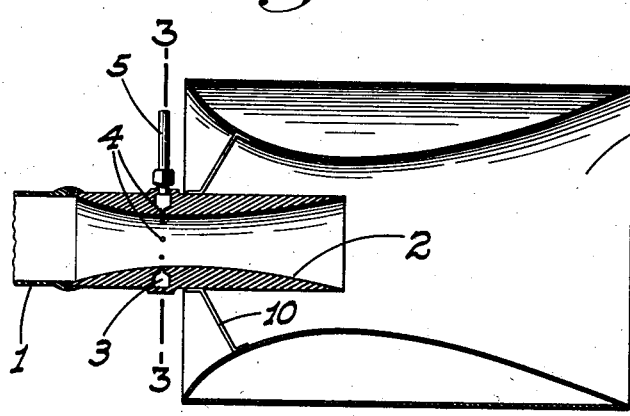
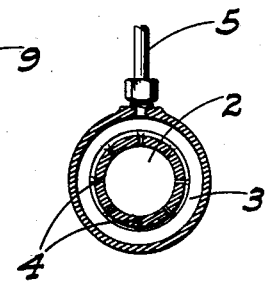
INVENTOR
John L. Berney
BY
ATTORNEY Patented Dec. 27, 1932

1,892,132

UNITED STATES PATENT OFFICE

JOHN L. BERNEY, OF MODESTO, CALIFORNIA, ASSIGNOR TO E. R. HAWKE, OF MODESTO, CALIFORNIA

ATOMIZING ATTACHMENT FOR AIRPLANE ENGINE EXHAUSTS

Application filed September 29, 1931. Serial No. 565,719.

This invention relates to spray distribution by means of an airplane, particularly with a view to destroying insects and other pests on vegetation.

It has long been known that the atomizing of a liquid may be accomplished by discharging the liquid to be atomized into a flow of gases at a high velocity (usually air), provided the discharge is made through sufficiently small jets or passages.

The principal object of my invention is to provide a spray device for use on an airplane in which the atomizing of the liquid is accomplished along the above lines by means of exhaust gases from the engine of the airplane as such gases discharge into the atmosphere, and which have a velocity sufficiently high to be very effective for the purpose.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary perspective outline of an airplane showing the exhaust actuating spray device mounted thereon.

Fig. 2 is an enlarged longitudinal section of the atomizing structure of the device.

Fig. 3 is a cross section on the line 3—3 of Fig. 2.

Referring now more particularly to the characters of reference on the drawing, the numeral 1 denotes the exhaust pipe from the engine of an airplane which pipe at its outer end is connected to a Venturi tube 2. This tube is practically the same diameter as the pipe and is arranged as an extension or continuation thereof. Formed in the tube in the zone of its throat and extending all about the tube is a liquid distributing passage 3, from which is a plurality of small jet passages 4 open radially into the tube at its throat. The liquid is fed to the passage 3 from a pipe 5 leading from a supply tank 6 carried by the airplane. The pipe has a valve 7 therein which is controlled at will by the pilot from his seat by a pedal operated mechanism indicated at 8, or other suitable means.

The tube 2 projects centrally into the forward end of a relatively large outer Venturi tube 9 which is adapted to be mounted in a longitudinally disposed relation on the airplane. The two tubes are held in proper rigid relationship by any suitable means such as radial straps 10 therebetween.

In practice a pair of the devices are preferably mounted on opposite sides of the airplane in fixed connection with certain ones of the struts 11 of the landing wheels 12 as shown in Fig. 1, so that the discharge from the outer tubes 9 will be below the fuselage and clear of any parts of the airplane. The pipe 5 is of course branched to extend to both liquid distributing passages from a point below the valve 7 so that a single valve will control the flow to both atomizing devices.

In operation oil or any other liquid to be atomized and suitable for the purpose, is delivered to the jet passages 4 and upon entering the Venturi tube 2, comes in contact with the high velocity flow of the exhaust gases, which cause the atomizing of the liquid by the physical action of the gas flow. The atomizing action is enhanced by the heat of the gases which tends to vaporize the liquid. The purpose of the outer Venturi tube is to confine the high velocity atomized discharge from the tube 2 somewhat and so control and better direct its ultimate discharge into the atmosphere.

This outer tube however serves another valuable purpose as well. Experiments have demonstrated that the atomizing of an oil spray in connection with the flow of air through the outer Venturi tube will act on the exhaust to muffle the objectionable noise to a large extent. Apart from this, demonstrations have proved that the high velocity air flow through the outer venturi, as the airplane travels through the air, acts on the exhaust gases to aid in the discharge from the Venturi tube 2 and thus relieves back pressure in the pipe and exhaust system of the engine generally to a very material degree.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with the exhaust pipe of an internal combustion engine, a Venturi tube attached at its forward end to the outer end of the pipe and forming a continuation thereof, and means to discharge a liquid to be atomized into the tube intermediate its ends.

2. In combination with the exhaust pipe of an internal combustion engine, a Venturi tube arranged as a continuation of the outer end of the pipe, a passage for liquid about said tube, jet-passages from said first passage to the interior of the tube adjacent its throat, and means to feed a liquid into said first named passage.

3. In an airplane having an internal combustion engine and an exhaust pipe leading therefrom to a rearwardly facing termination, a Venturi tube attached to and forming a rearward continuation of the pipe, and means to feed a spray liquid into the tube in position to be atomized by the flow of exhaust gases therethrough.

4. A structure as in claim 3, with a relatively large Venturi tube mounted in longitudinally alined relation on the airplane and into the forward end of which the first named tube projects.

In testimony whereof I affix my signature.

JOHN L. BERNEY.